(12) United States Patent
de Rooij et al.

(10) Patent No.: US 7,929,325 B2
(45) Date of Patent: Apr. 19, 2011

(54) HIGH EFFICIENCY, MULTI-SOURCE PHOTOVOLTAIC INVERTER

(75) Inventors: Michael Andrew de Rooij, Schenectady, NY (US); John Stanley Glaser, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 393 days.

(21) Appl. No.: 12/154,745

(22) Filed: May 27, 2008

(65) Prior Publication Data

US 2009/0296434 A1 Dec. 3, 2009

(51) Int. Cl.
*H02J 1/10* (2006.01)
(52) U.S. Cl. .......................................... 363/71
(58) Field of Classification Search ............... 363/65, 363/71, 97, 98, 131, 132
See application file for complete search history.

(56) References Cited

U.S. PATENT DOCUMENTS

| | | | |
|---|---|---|---|
| 5,623,398 A * | 4/1997 | Beach et al. .................... 363/65 |
| 6,693,805 B1 | 2/2004 | Steigerwald et al. ........... 363/39 |
| 6,809,942 B2 * | 10/2004 | Madenokouji et al. ......... 363/98 |
| 7,016,205 B2 | 3/2006 | Steigerwald et al. ........... 363/40 |
| 7,602,626 B2 * | 10/2009 | Iwata et al. .................... 363/71 |
| 2004/0125618 A1 | 7/2004 | de Rooij et al. ............... 363/17 |
| 2005/0139259 A1 | 6/2005 | Steigerwald et al. ......... 136/293 |
| 2006/0185727 A1 | 8/2006 | Matan ........................... 136/293 |
| 2008/0055941 A1 * | 3/2008 | Victor et al. ................... 363/17 |

FOREIGN PATENT DOCUMENTS

WO WO0205403 1/2002

OTHER PUBLICATIONS

A. Cocconi, S. Cuk, R.D. Middlebrook, "High-Frequency Isolated 4kW Photovoltaic Inverter for Utility Interface", TESLAco, reprinted from PCI'83 Conference, pp. 325-345, Sep. 1983, Geneva, Switzerland.

* cited by examiner

*Primary Examiner* — Matthew V Nguyen
(74) *Attorney, Agent, or Firm* — Ann M. Agosti

(57) ABSTRACT

A photovoltaic (PV) inverter system operates continuously in a buck converter mode to generate a sum of full wave rectified sine wave currents at a current node common to a plurality of buck converters in response to a plurality of full wave rectified sine wave currents generated via the plurality of buck converters. The PV inverter system increases the level of the voltage sourcing each buck converter when a corresponding DC power source voltage is lower than the instantaneous voltage of a utility grid connected to the PV inverter system.

17 Claims, 5 Drawing Sheets

HIGH EFFICIENCY, MULTI-SOURCE PHOTOVOLTAIC INVERTER

BACKGROUND

The invention relates generally to electronic power conversion and more particularly to a very high conversion efficiency, grid connected, single phase, multi-source photovoltaic (PV) inverter.

Photovoltaic (PV) cells generate direct current (DC) power with the level of DC current being dependent on solar irradiation and the level of DC voltage dependent on temperature. When alternating current (AC) power is desired, an inverter is used to convert the DC energy into AC energy. Typical PV inverters employ two stages for power processing with the first stage configured for providing a constant DC voltage and the second stage configured for converting the constant DC voltage to AC current. Often, the first stage includes a boost converter, and the second stage includes a single-phase or three-phase inverter system. The efficiency of the two-stage inverter is an important parameter affecting PV system performance and is a multiple of the individual stage efficiencies with each stage typically causing one-half of the system losses.

Single phase photovoltaic inverters generally require a two-stage conversion power circuit to convert the varying DC voltage of a PV array to the fixed frequency AC voltage of the grid. Traditional PV inverters use a DC link as the intermediate energy storage step, which means that the converter first converts the unstable PV array voltage to a stable DC voltage and subsequently converts the stable voltage into a current that can be injected into the grid.

Traditional single phase PV inverters also undesirably control the power circuits with a fixed switching frequency using a plurality i.e. five, of switching devices that contribute to the overall switching losses. Switching losses are typically kept as low as possible when using traditional PV inverters by keeping the switching frequency low.

It would be both advantageous and beneficial to provide a residential photovoltaic inverter that employs fewer high frequency switching devices than that employed by a traditional PV inverter. It would be further advantageous if the PV inverter could employ adaptive digital control techniques to ensure the PV inverter is always operating at peak efficiency, even when drawing power from multiple input sources, including without limitation, PV arrays, batteries and fuel cells.

BRIEF DESCRIPTION

Briefly, in accordance with one embodiment, a photovoltaic (PV) inverter comprises:
 a bucking converter configured to generate a full wave rectified sine wave current at a current summing node common to a plurality of bucking converters in response to an available PV array power and a utility grid instantaneous voltage;
 a boosting circuit configured to increase the level of the voltage sourcing the bucking converter when the PV array output voltage is lower than the instantaneous voltage of the utility grid; and
 a current unfolding circuit comprising switching devices configured to switch synchronously with the utility grid so as to construct an AC current in response to the full wave rectified sine wave current.

According to another embodiment, a photovoltaic (PV) inverter system comprises:
 a plurality of bucking circuits, each bucking circuit associated with a corresponding DC power source; and
 a single full bridge current unfolding circuit,
 wherein each bucking circuit is configured to continuously operate in a buck mode to generate a corresponding full wave rectified sine wave current, and further wherein the plurality of bucking circuits are configured together to generate a resultant full wave rectified sine wave at a single common current node by summing the plurality of full wave rectified sine wave currents generated by the plurality of bucking circuits,
 and further wherein the single full bridge current unfolding circuit generates a desired utility grid AC current in response to the resultant full wave rectified sine wave current.

According to yet another embodiment of the invention, a photovoltaic (PV) inverter system is configured to continuously operate in a buck converter mode to generate a sum of full wave rectified sine wave currents at a current node common to a plurality of buck converters in response to a plurality of full wave rectified sine wave currents generated via the plurality of buck converters, and is further configured to increase the level of the voltage sourcing each buck converter, via a corresponding boost converter, when a corresponding DC power source voltage is lower than the instantaneous voltage of a utility grid connected to the PV inverter system.

According to still another embodiment of the invention, a photovoltaic (PV) inverter system comprises:
 a plurality of soft switching bucking circuits, each soft switching bucking circuit associated with a corresponding DC power source and configured to substantially cancel a ripple current associated with a corresponding waveshaping inductor;
 a boost converter corresponding to each soft switching bucking circuit, each boost converter configured such that it is not continuously boosting over the entire PV inverter switching cycle thereby minimizing the impact on PV inverter system efficiency for having to boost the corresponding DC power source voltage; and
 a single full bridge current unfolding circuit configured to operate at near zero current and voltage levels during its switching period,
 wherein each soft switching bucking circuit is configured to continuously operate in a buck mode to generate a corresponding full wave rectified sine wave current, and further wherein the plurality of soft switching bucking circuits are configured together to generate a resultant full wave rectified sine wave at a single common current node by summing the plurality of full wave rectified sine wave currents generated by the plurality of soft switching bucking circuits, and further wherein the single full bridge current unfolding circuit generates a desired utility grid AC current.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
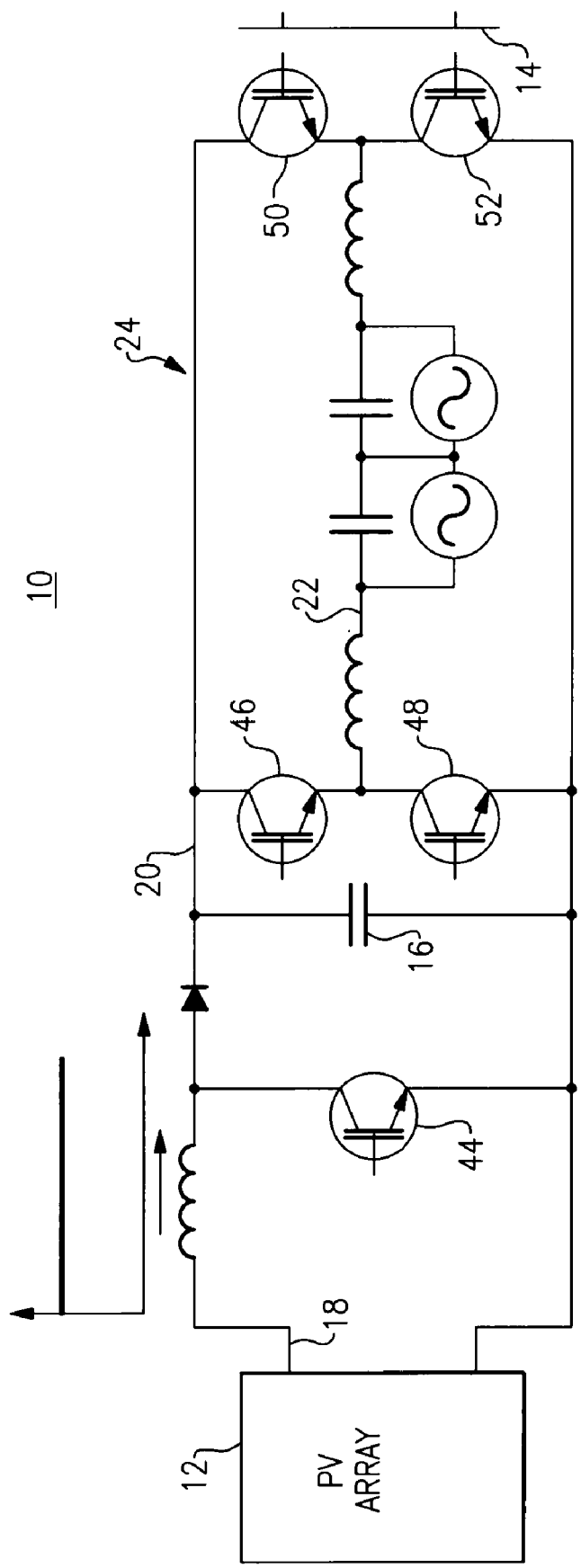
FIG. 1 is illustrates a photovoltaic inverter topology that is known in the art.

FIG. 1 is illustrates a photovoltaic inverter 10 topology that is known in the art. Photovoltaic inverter 10 employs a two-stage power circuit to convert a varying DC voltage of a PV array 12 to a fixed frequency AC current for a power grid 14. Photovoltaic inverter 10 uses a DC link capacitor 16 to implement the intermediate energy storage step. This means the PV inverter 10 first converts the unstable PV DC voltage 18 to a stable DC voltage 20 that is greater than the grid voltage via a boost converter, and subsequently converts the stable DC voltage 20 to a current 22 via a PWM circuit 24 that can then be injected into the grid 14. Photovoltaic inverter 10 topology employs five switching devices 44, 46, 48, 50, 52 that are all switching at a high frequency and that undesirably contribute to the overall switching losses of the two-stage converter.

Figure 2:
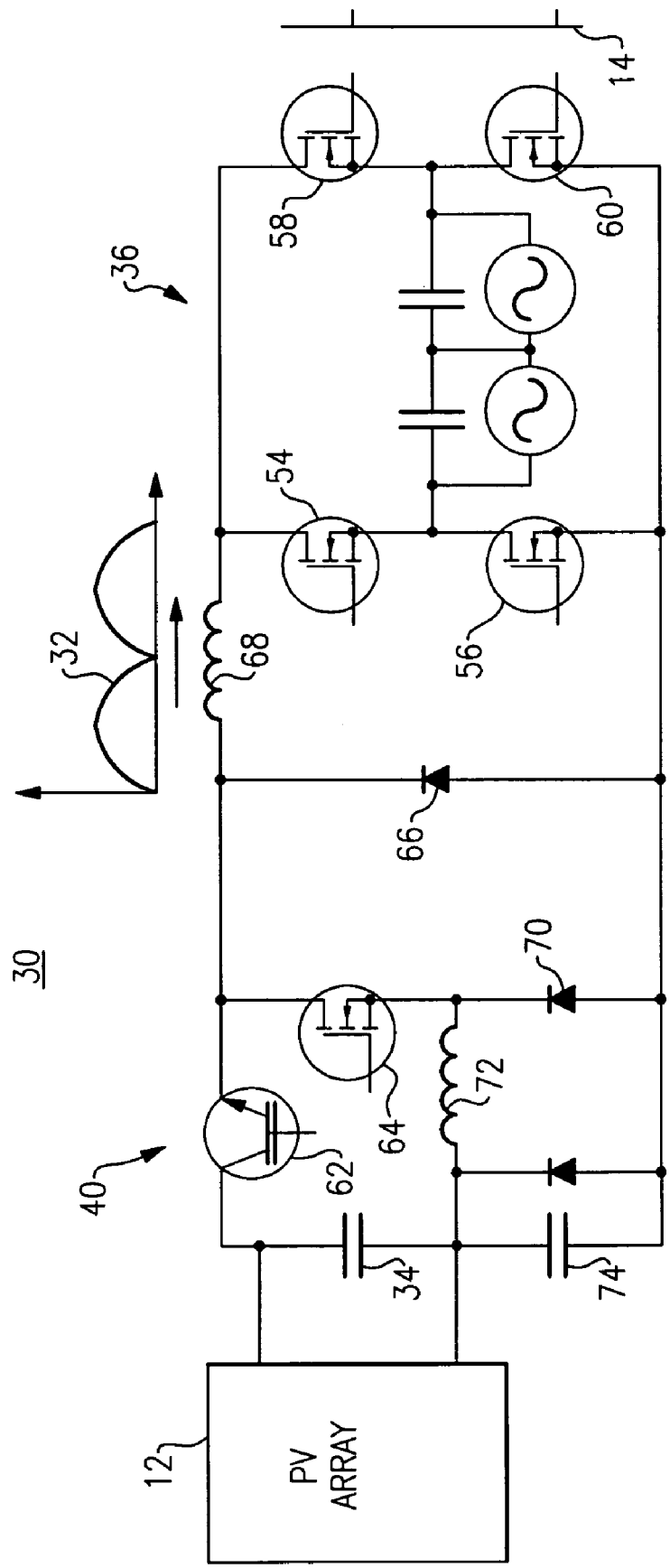
FIG. 2 illustrates a photovoltaic inverter topology according to one embodiment of the invention.

FIG. 2 illustrates a photovoltaic inverter 30 hard-switching topology according to one embodiment of the invention. Photovoltaic inverter 30 topology overcomes the necessity to employ a DC link to implement an intermediate energy storage step such as described above with reference to FIG. 1, because PV inverter 30 topology converts the PV array 12 voltage immediately into a current 32 that is the equivalent of a rectified grid current. This feature is implemented by stiffening each leg of the PV array 12 with a large capacitance 34, effectively shifting the DC link to the PV array 12 thereby stabilizing the PV array output voltage during generation of the rectified grid current.

The subsequent inverter stage 36 merely needs to unfold the current 32 into the grid 14, and does so without switching losses because the inverter stage switching devices 54, 56, 58, 60 switch only at the utility grid 14 zero voltage level and with zero current. The first stage 40 is thus the only stage that has switching losses from high frequency buck switching device 62 and high frequency boost switching device 64, verses the traditional converter 10 that has five high frequency switching devices 44, 46, 48, 50, 52 such as depicted in FIG. 1 that all contribute to the switching losses.

With continued reference to FIG. 2, photovoltaic inverter 30 includes a bucking circuit switch 62 that works in combination with a diode 66 and a wave shaping inductor 68. PV inverter 30 also includes a boosting circuit switch 64 that works in combination with a diode 70 and a boost inductor 72.

The bucking circuit comprising switch 62, diode 66 and inductor 68 is operational at all times; while the boosting circuit comprising switch 64, diode 70 and inductor 72 is operational only when the output voltage of the PV array 12 is lower than the instantaneous voltage of the utility grid 14. The boosting circuit then pumps additional current from the PV array 12 stored in boosting inductor 72 into storage capacitor 74 whenever the output voltage of the PV array 12 is lower than the utility grid instantaneous voltage. The resultant combined voltage across capacitor 34 and capacitor 74 provides the voltage necessary to operate the bucking circuit that remains operational during the boost operating mode.

Figure 3:
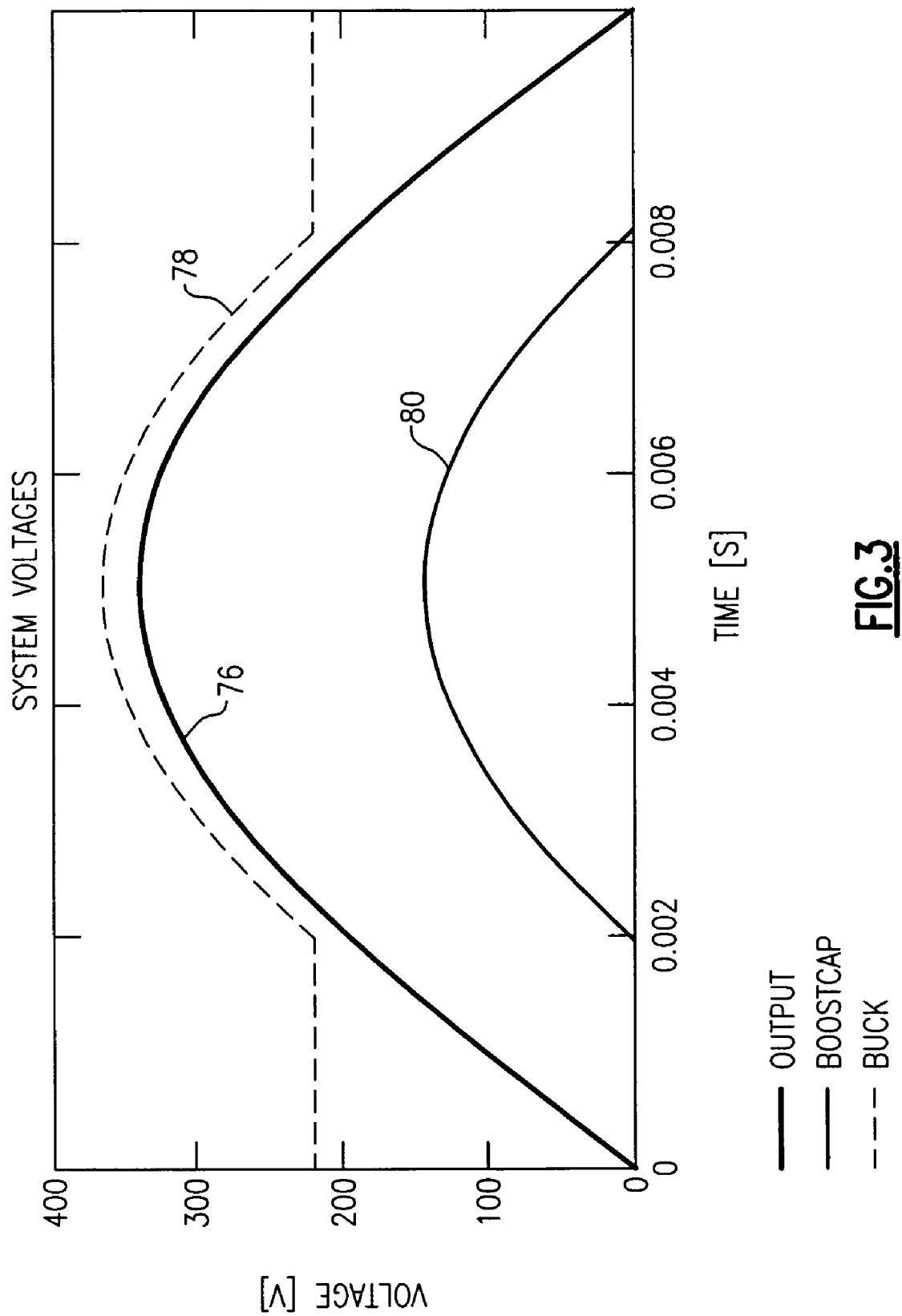
FIG. 3 is a graph illustrating a buck-boost switching scheme according to one embodiment of the invention.

The above described buck and boost functions occur dynamically as depicted for one embodiment in FIG. 3. With reference now to FIG. 3, the boost function occurs whenever the utility grid instantaneous voltage 76 exceeds a desired PV array 12 output voltage of 220 volts. The voltage 80 provided by the boost capacitor 74 is added to the buck voltage 78 to allow proper bucking when the utility grid instantaneous voltage 76 exceeds 220 volts. This advantageously results in a boost converter that is not continuously boosting over the entire cycle thereby minimizing the impact on efficiency for having to boost the PV array voltage.

Traditional inverters such as described above with reference to FIG. 1, control the power circuits with a fixed switching frequency. The present inventors recognized that when the conversion efficiencies are very high, improvements can be gained by use of adaptive digital control techniques. An adaptive digital controller can thus be employed that adjusts the switching frequency to compensate for changes in the semiconductor devices 62, 64 and inductor 68, 72 performance for various operating conditions and temperatures so that the highest possible conversion efficiency is obtained.

Adaptive digital control techniques can include a boost circuit switch 64 control signal that is linked to the buck circuit switch 62 so that under certain conditions, boost switch 64 turn-on can be delayed, but such that boost switch 64 turn off can be delayed with respect to the buck switch 62 turn-off such that only one switch carries all of the losses while the other switch carries no losses.

In summary explanation, a photovoltaic inverter 30 topology advantageously functions with a significant reduction in the number of power electronic devices that will be switching at a high frequency at any point in time. This feature provides an additional benefit that is a result of lower conduction losses associated with slower devices that can be selected to complete the inverter system.

The photovoltaic array source 12 is stiffened via a large capacitance 34 such as described above to ensure a stable supply voltage source is provided for the bucking circuit. This large capacitance 34 advantageously does not compromise the safety aspects of the system as the PV source 12 is current limited.

Attached to the capacitor 34 is the first stage buck converter 40 that creates a full wave rectified sine current in the main inductor 68. This current is then unfolded into the grid 14 by the full bridge inverter 36 connected to the output of the PV inverter 30.

The PV inverter 30 topology was found to provide suitable working results so long as the PV source voltage remains higher than the instantaneous grid voltage. In cases where the PV source 12 voltage is less than the instantaneous grid 14 voltage, the operation of the PV inverter 30 is configured to ensure that the current in the bucking inductor 68 always flows from the PV source 12 to the grid 14. This is achieved by turning on the boosting circuit to increase the input voltage to the bucking circuit to a value greater than the instantaneous grid voltage.

Because current boosting is employed only when necessary, i.e. when the PV array 12 voltage is lower than the instantaneous grid 14 voltage, inverter switching efficiency is increased above that achievable when compared to a conventional PV converter topology such as described above with reference to FIG. 1.

Photovoltaic inverter 30 can be just as easily implemented using a soft-switching topology according to another embodiment of the invention. The use of a soft switching topology allows slower devices having lower conduction losses to be selected for use in the buck converter portion of the PV inverter. PV inverter 30 utilizes a topology well suited to use of adaptive digital control methods, as stated above, for seeking the most efficient operating point for the system based on operating conditions such as, without limitation, temperature, input voltage and load power level.

Figure 4:
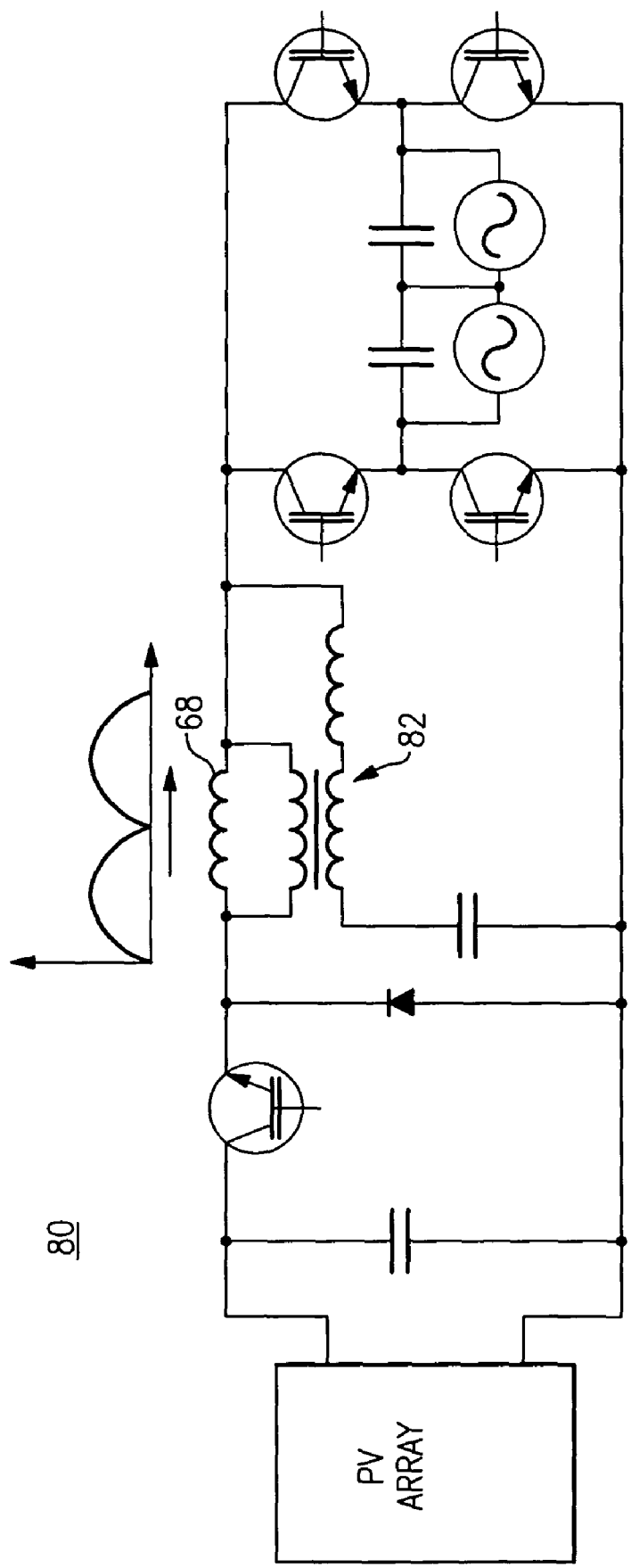
FIG. 4 illustrates a photovoltaic inverter topology including a ripple current cancellation circuit according to still another embodiment of the invention.

Looking now at FIG. 4, a PV inverter 80 includes a ripple current cancellation circuit 82 that provides a means for reducing the main inductor 68 size without compromising the output ripple current requirements of the system. Ripple current cancellation circuit 82 allows use of a smaller inductor 68 having lower losses than that achievable with a larger inductor, and also allows the use of quasi resonant switching, significantly reducing switching losses.

Figure 5:
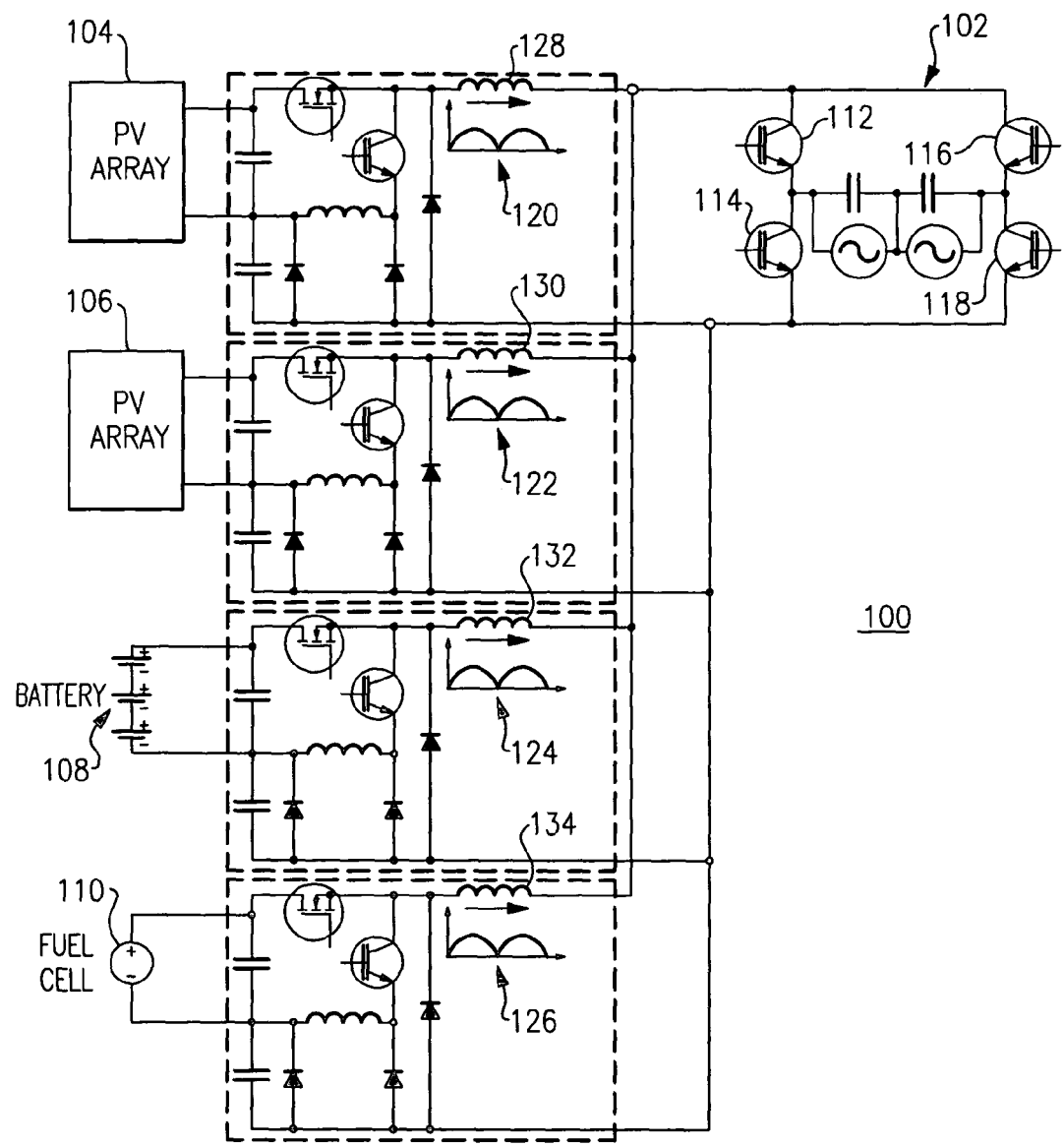
FIG. 5 illustrates a multiple source input photovoltaic inverter topology according to one embodiment of the invention.

FIG. 5 illustrates a multiple source input photovoltaic inverter topology 100 according to one embodiment of the invention. PV inverter topology 100 includes an output unfolding circuit 102 that functions solely to unfold a rectified current waveform produced by summing the rectified currents generated via a plurality of power sources including a first PV array 104, a second PV array 106, a battery bank 108 and a fuel cell 110. As such, the unfolding circuit 102 never switches at high frequencies since the unfolding circuit switching devices 112, 114, 116, 118 only switch at twice the utility grid frequency. All of the power source currents 120, 122, 124, 126 are referenced to one common voltage to achieve the desired current summing function.

Each of the wave shaping inductors 128, 130, 132, 134 performs only a current wave shaping function, and therefore does not perform any type of current boosting function such as seen with known buck/boost converter designs. The present invention is not so limited however, and any number of many different types of power sources can be employed in similar fashion to implement a multiple source input PV inverter topology in accordance with the principles described herein.

Advantages provided by the PV inverter topologies 30, 100 include without limitation, buck and boost capabilities incorporated into a single DC to AC converter using a dual capacitor bank without employment of a conventional buck/boost topology. Other advantages include, without limitation, maximization of efficiency by minimizing the number of power semiconductor devices switched between the source and the load, the use of multiple technologies within a single PV inverter to enhance the high efficiency topology, such as the ripple current cancellation capabilities described above with reference to FIG. 4, the use of soft-switching techniques, a topology that is well suited to use of adaptive digital control methods for seeking the most efficient operating point for the system based on operating conditions such as, without limitation, temperature, input voltage and load power level, and optional step activation of the AC contactor, wherein after the contactor/relay is energized, the holding current is reduced just enough to maintain the holding state.

Maximizing efficiency by minimizing the number of series power semiconductors switched between the source and the load, and the selection of power semiconductors to achieve maximum efficiency provide further advantages over known PV inverters.

In summary explanation, the embodiments described above present a very high conversion efficiency grid connected residential photovoltaic inverter that can be used with multiple PV arrays and/or alternate energy sources. The inverter creates a sinusoidal current that is proportional to the grid voltage and exhibits a high power factor. The high efficiency is achieved by having only one power semiconductor device that will be switching at a high frequency, while all other devices will be switched at the grid frequency. The main switching device of the buck converter creates a full wave rectified sine wave current that is unfolded into the grid supply. This unfolding circuit also avoids switching losses as both the current and the voltage will be near zero across the devices during the switching period. For PV array voltages greater than the grid voltage, the circuit operates solely as a buck converter. For PV array voltages lower than the grid voltage, the boost circuit operates in synchronism with the buck converter. The configuration ensures that the buck converter voltage is always greater than the grid voltage. The output inverter full bridge is never switched at high frequencies. Further efficiency improvements can be realized by special selection of the switching devices, by digital control adjustments that ensure that the inverter is always operating at peak efficiency such as compensating the switching frequency for changes in input voltage, load current and system temperature, by implementation of the ripple current cancellation circuit so that a small lower loss inductor can be selected for the main circuit, and by adding a quasi resonant circuit across the main switching device that ensures soft switching, as described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A photovoltaic (PV) inverter system comprising:
a plurality of bucking circuits, each bucking circuit associated with a corresponding DC power source; and
a single full bridge current unfolding circuit,
wherein each bucking circuit is configured to continuously operate in a buck mode to generate a corresponding full wave rectified sine wave current, and further wherein the plurality of bucking circuits are configured together to generate a resultant full wave rectified sine wave at a single common current node by summing the plurality of full wave rectified sine wave currents generated by the plurality of bucking circuits,
and further wherein the single full bridge current unfolding circuit generates a desired utility grid AC current in response to the resultant full wave rectified sine wave current.

2. The PV inverter system according to claim 1, wherein each bucking circuit is configured to generate a full wave rectified sine wave current via a respective bucking circuit wave shaping inductor in response to available power from its corresponding DC power source and the utility grid instantaneous voltage.

3. The PV inverter system according to claim 2, wherein each DC power source is associated with a corresponding boosting circuit configured to increase the level of the voltage sourcing the bucking circuit via a boosting circuit inductor when the corresponding DC power source output voltage is lower than the instantaneous voltage of the utility grid.

4. The PV inverter system according to claim 3, wherein each boosting circuit comprises only one boosting circuit switch and each bucking circuit comprises only one bucking circuit switch, wherein the boosting circuit switch is configured to have a delayed turn-on during desired operating conditions, and further wherein the boosting circuit switch turn off is delayed with respect to the bucking circuit switch turn-off such that only one switch carries substantially all losses while the other switch carries substantially no losses.

5. The PV inverter system according to claim 1, wherein each bucking circuit comprises only one switching device, wherein the only one switching device is a high frequency switching device and the unfolding circuit comprises only utility grid low frequency switching devices.

6. A photovoltaic (PV) inverter system configured to continuously operate in a buck converter mode to generate a sum of full wave rectified sine wave currents at a current node common to a plurality of buck converters in response to a plurality of full wave rectified sine wave currents generated via the plurality of buck converters, and further configured to increase the level of the voltage sourcing each buck converter, via a corresponding boost converter, when a corresponding DC power source voltage is lower than the instantaneous voltage of a utility grid connected to the PV inverter system.

7. The PV inverter system according to claim 6 further comprising a full bridge unfolding circuit configured to generate a utility grid current in response to the sum of full wave rectified sine wave currents.

8. The PV inverter system according to claim 7, wherein the full bridge unfolding circuit comprises a plurality of switching devices, and further wherein all full bridge unfolding circuit switching devices switch only at twice the utility grid low frequency.

9. The PV inverter system according to claim 8, wherein each full bridge unfolding circuit switching device is configured to operate at near zero current and voltage levels during its switching period.

10. The PV inverter system according to claim 6, wherein each buck converter comprises only one switching device, and further wherein the only one switching device is a high frequency switching device.

11. The PV inverter system according to claim 6, wherein the increased level of voltage sourcing each buck converter is generated via a corresponding boosting circuit, each boosting circuit comprising only one switching device, wherein the only one boosting circuit switching device is a high frequency switching device.

12. The PV inverter system according to claim 11, wherein each buck converter and its corresponding boosting circuit are configured together to adaptively adjust the buck converter switching frequency and its corresponding boosting circuit switching frequency in response to desired operational characteristics to achieve a PV inverter system efficiency greater than that achievable using fixed switching frequency PV inverter techniques.

13. The PV inverter system according to claim 12, wherein the desired operational characteristics are selected from PV array voltage levels, PV inverter ambient operating temperatures, PV inverter switching device temperatures, and grid power levels.

14. The PV inverter system according to claim 11, wherein each boosting circuit comprises only one boosting circuit switch and each buck converter comprises only one buck converter switch, wherein each boosting circuit switch is configured to have a delayed turn-on time during desired operating conditions, and further wherein each only one boosting circuit switch and its corresponding only one buck converter switch are configured to turn-off simultaneously such that only one of the buck converter or corresponding boosting circuit switches carries substantially all switching losses while the other buck converter or corresponding boosting circuit switch carries substantially no switching losses.

15. The PV inverter system according to claim 6, further configured to reduce at least one buck converter waveshaping inductor size without compromising the output ripple current requirements of the PV inverter system.

16. The PV inverter system according to claim 15, further configured to substantially cancel a ripple current corresponding to at least one buck converter waveshaping inductor.

17. The PV inverter system according to claim 6, further configured via a soft switching technique to allow slower devices having lower conduction losses to be selected for use in at least one buck converter.

* * * * *